United States Patent
Kovach et al.

(10) Patent No.: US 8,596,165 B2
(45) Date of Patent: Dec. 3, 2013

(54) MULTIPLE GEAR MOTOR DRIVE

(75) Inventors: Joseph A. Kovach, Aurora, OH (US); Lisa K. Furches, Charlotte, NC (US); Richard D. Kimpel, Middleburg Heights, OH (US); Hao Zhang, Solon, OH (US); Raymond E. Collett, Put-In-Bay, OH (US); Lori A. Martinelli, Lordstown, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 1521 days.

(21) Appl. No.: 11/761,041

(22) Filed: Jun. 11, 2007

(65) Prior Publication Data

US 2008/0113838 A1 May 15, 2008

Related U.S. Application Data

(60) Provisional application No. 60/812,280, filed on Jun. 9, 2006.

(51) Int. Cl.
*F16H 37/06* (2006.01)
*F16H 47/04* (2006.01)

(52) U.S. Cl.
USPC .............................. 74/661; 475/75

(58) Field of Classification Search
USPC ........ 475/4, 5, 10, 72, 75; 74/661; 180/65.61, 180/65.56, 65.57
See application file for complete search history.

(56) References Cited

U.S. PATENT DOCUMENTS

| | | | |
|---|---|---|---|
| 2,463,349 A * | 3/1949 | Baner | 310/112 |
| 3,766,995 A | 10/1973 | Young et al. | |
| 4,177,693 A | 12/1979 | Ivanko et al. | |
| 4,274,302 A * | 6/1981 | Herscovici | 74/661 |
| 4,380,255 A * | 4/1983 | Fromm | 140/93.2 |
| 4,584,903 A | 4/1986 | Hirt et al. | |
| 4,685,354 A | 8/1987 | McCabria | |
| 4,797,060 A | 1/1989 | Kishi et al. | |
| 4,803,390 A | 2/1989 | Bertram et al. | |
| 4,829,850 A | 5/1989 | Soloy | |
| 4,858,490 A | 8/1989 | Grant | |
| 4,928,552 A | 5/1990 | Gabriele | |
| 5,387,818 A | 2/1995 | Leibowitz | |
| 5,463,914 A * | 11/1995 | Tyan | 74/661 |
| 5,518,461 A * | 5/1996 | Pfordt | 475/72 |
| 5,954,144 A | 9/1999 | Thames | |
| 6,030,196 A | 2/2000 | Coeuret | |
| 6,786,289 B2 | 9/2004 | Batemen et al. | |
| 6,889,578 B2 * | 5/2005 | Spaziani et al. | 74/661 |
| 7,011,275 B2 | 3/2006 | Redfern | |
| 7,044,877 B2 | 5/2006 | Ai | |
| 7,270,030 B1 * | 9/2007 | Belloso | 74/661 |
| 7,326,141 B2 * | 2/2008 | Lyons et al. | 475/28 |
| 2004/0251862 A1 | 12/2004 | Imai | |
| 2006/0009323 A1 | 1/2006 | Zhang | |
| 2005/0107199 A1 | 5/2007 | Kim | |

\* cited by examiner

*Primary Examiner* — Tisha Lewis
(74) *Attorney, Agent, or Firm* — Renner, Otto, Boisselle & Sklar, LLP

(57) ABSTRACT

A hydraulic drive comprising multiple gear motors each having a gear motor output shaft, and a common gear engaged by the output shafts of the multiple gear motors. Each hydraulic motor has a characteristic sinusoidal torque ripple out of phase with the characteristic sinusoidal torque ripple of at least one other hydraulic motor for cancelling torque ripple and thereby reducing the torque ripple at the common gear.

16 Claims, 4 Drawing Sheets

MULTIPLE GEAR MOTOR DRIVE

RELATED APPLICATION DATA

This application claims the benefit of U.S. Provisional Application No. 60/812,280 filed Jun. 9, 2006, which is hereby incorporated herein by reference in its entirety.

FIELD OF THE INVENTION

The herein described invention relates generally to hydraulic drives and, more particularly, to a versatile and efficient hydraulic drive employing multiple gear motors in a unique configuration.

BACKGROUND OF THE INVENTION

Utility vehicles for agriculture, forestry or construction, as well as winches and cranes, are often driven by one or more hydraulic motors via a speed reduction gear or a step-down gear unit. Such vehicles typically include one or more pumps for supplying pressurized hydraulic fluid to one or more hydraulic gear motors. Many gear motors, because of the geometry of the gear teeth, inherently produce a small torque pulse for each gear tooth as the gears rotate, and this in turn produces torque pulses in the drive output of the motor. Such torque pulses are commonly referred to as torque ripple. The torque ripple can produce undesirable noise and vibration.

SUMMARY OF THE INVENTION

The present invention provides a hydraulic drive employing multiple hydraulic motors, especially gear motors, in a manner that provides one or more of several advantages heretofore not attainable by conventional hydraulic drives. Among these advantages is the ability to reduce or essentially eliminate torque ripple, even while using conventional and proven hydraulic motor design technology as opposed to more costly ripple reducing technologies. Another advantage is that features of the invention may be packaged in a compact housing that may also allow for stacking of multiple hydraulic drives to increase torque loads and increase volumetric output.

More particularly, the invention provides a hydraulic drive comprising multiple gear motors each having a gear motor output shaft, and a common gear engaged by the output shafts of the multiple gear motors. The common gear may be a ring gear that drives an output shaft of the hydraulic drive. The multiple gear motors preferably are housed within a housing, and the output shaft of the hydraulic drive may extend from either end or both ends of the housing.

In a preferred embodiment, the multiple gear motors include respective meshed pairs of gears disposed in a common housing. One of the gears of each pair may have an output shaft provided with a pinion gear for engaging the common gear. The phase relationship between the pinion gear and corresponding gear of each gear set may be varied from gear set to gear set to provide for cancellation of torque ripple.

A controller may be provided for controlling operation of the gear motors to control output speed and torque of the hydraulic drive.

According to another aspect of the invention, a hydraulic drive comprises multiple hydraulic motors each having an output shaft, and a common gear engaged by the output shafts of the multiple hydraulic motors. Each hydraulic motor has a characteristic periodic torque ripple out of phase with the characteristic periodic torque ripple of at least one other hydraulic motor for cancelling torque ripple and thereby reducing the torque ripple at the common gear.

The hydraulic motors may be gear motors, although other types of hydraulic motors exhibit periodic torque ripple such as hydraulic piston motors. The common gear may drive an output shaft of the hydraulic drive, and the multiple hydraulic motors may be housed within a housing with an output shaft of the hydraulic drive extending from at least one end of the housing.

The multiple hydraulic motors may each have an output shaft provided with a pinion gear for engaging the common gear, and the phase relationship between the pinion gear and hydraulic motor varies from hydraulic motor to hydraulic motor.

The hydraulic motor has particular application in a vehicle, such as a skid-steer utility vehicle, for driving the wheels (including track wheels if a track is employed) of the vehicle for propelling the vehicle.

Further features of the invention will become apparent from the following detailed description when considered in conjunction with the drawings.

DETAILED DESCRIPTION

Figure 1:
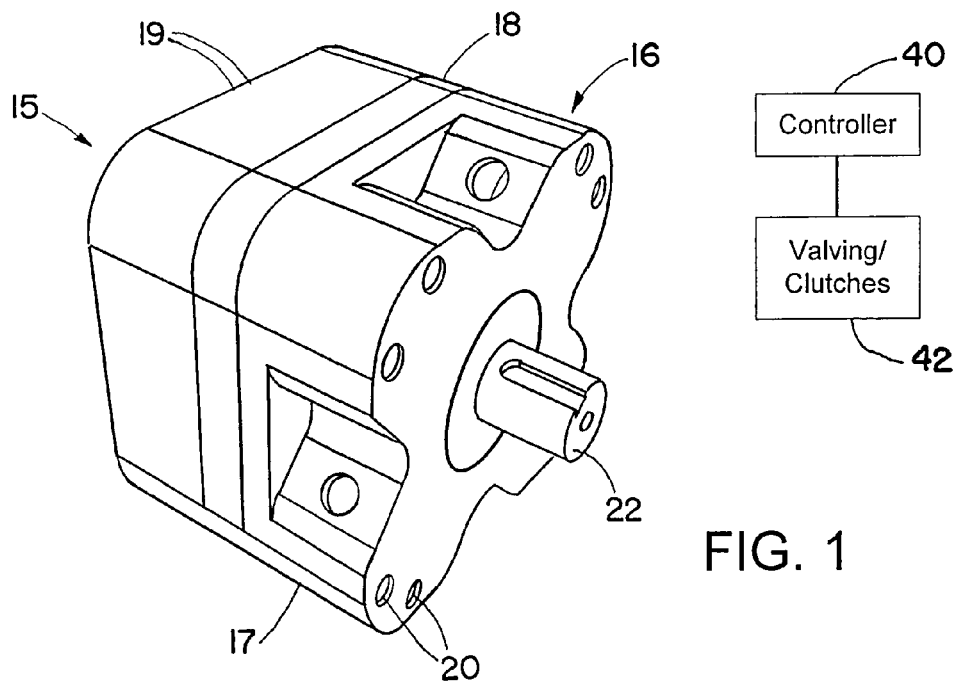
FIG. 1 is a front perspective view of an exemplary hydraulic drive according to the present invention.
Figure 2:
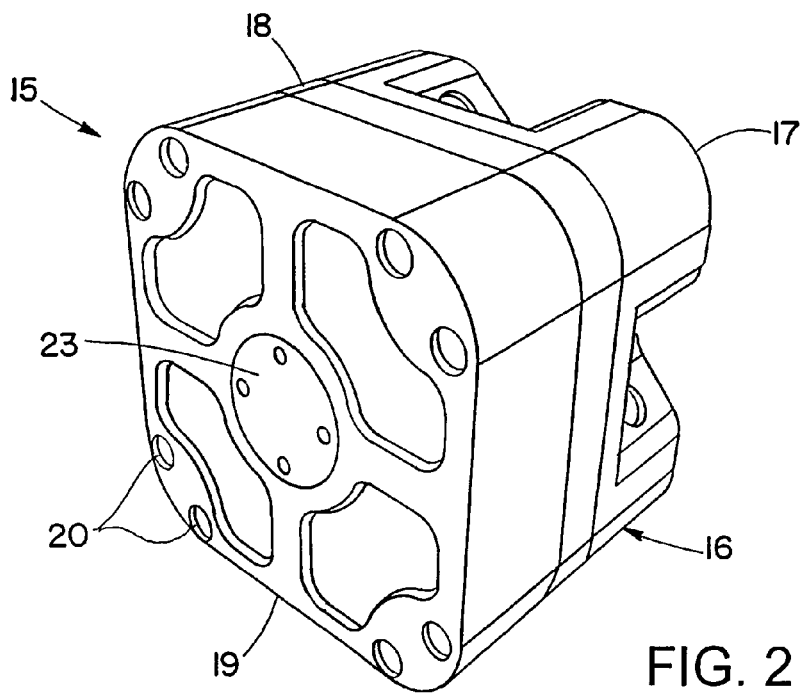
FIG. 2 is a rear perspective view of the hydraulic drive of FIG. 1.

Referring now in detail to the drawings and initially to FIGS. 1 and 2, an exemplary hydraulic drive according to the invention is designated generally by reference numeral 15. The hydraulic drive 15 has a housing 16 which comprises three axially stacked blocks 17-19 secured together by any suitable means, such as by bolts 20. A drive shaft 22 protrudes from the forwardmost block 17 that may be lobed as shown to reduce weight. The rearwardmost block 19 has a cover plate 23 covering a rear end of a through passage in which the drive shaft 22 is located. As will be appreciated, the drive shaft 22 may extend from either end of the housing 16 or from both ends of the housing as desired.

Figure 3:
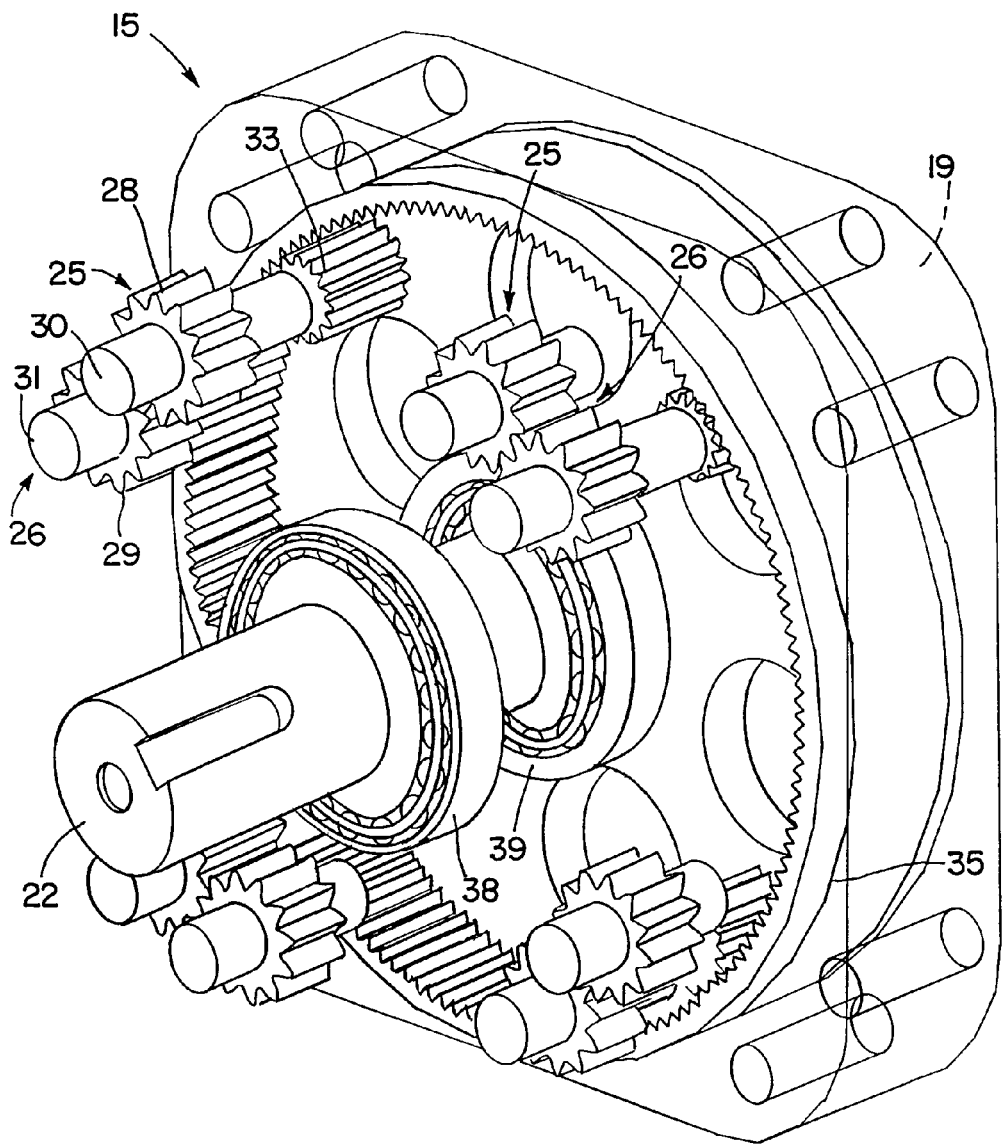
FIG. 3 is a perspective view of the hydraulic drive of FIG. 1, with parts removed to show internal components of the hydraulic drive including four meshed gear sets.

In FIG. 3 the housing blocks 17-19 have been removed to show internal components of the hydraulic drive 15. As shown, the hydraulic drive includes a plurality of gear sets 25 of respective gear motors 26. The balance of the gear motors 26 is formed by gear chambers and porting in the housing 15 which all may be of conventional design known to those skilled in the art and thus need not be further herein described. Each gear set 25 includes a pair of meshed gears 28 and 29 on respective gear shafts 30 and 31 protruding from opposite sides of the gear. Although not shown, the housing blocks 17 and 18 (FIGS. 1 and 2) have bores in which the shaft ends are rotatably supported by suitable bearings. One 30 of the shafts extends rearwardly and has a pinion gear 33 that engages the teeth of a ring or bull gear 35. In the illustrated embodiment, the ring gear is provided on the drive shaft 22 that is rotatably supported in the housing 15 by suitable bearings 38 and 39. Accordingly, rotation of the ring gear effects rotation of the drive shaft. In the illustrated embodiment, the ring gear is housed in a chamber in the rearwardmost housing block 19.

The pinions 33 of the gear sets 25 engage the ring gear 35 at circumferentially spaced apart locations that may be equally spaced apart as shown. The pinions and gear sets may be identical, although preferably the angular position of the pinion teeth relative to the teeth on the corresponding gear is varied among the gear sets. This is done so that each gear set is out of phase with at least one other gear set. The phasing may be selected such that the torque pulses (ripple) diametrically opposed gear sets are 180 degrees out of phase such that the pulses tend to cancel one another. In addition, the phasing of diametrically opposed pairs of gear sets may have the torque pulses out of phase with the torque pulses of other pairs of gear sets. As will be appreciated by those skilled in the art, the phasing of the gear sets, as well as the number of gear sets, may be varied as desired.

Figure 4:
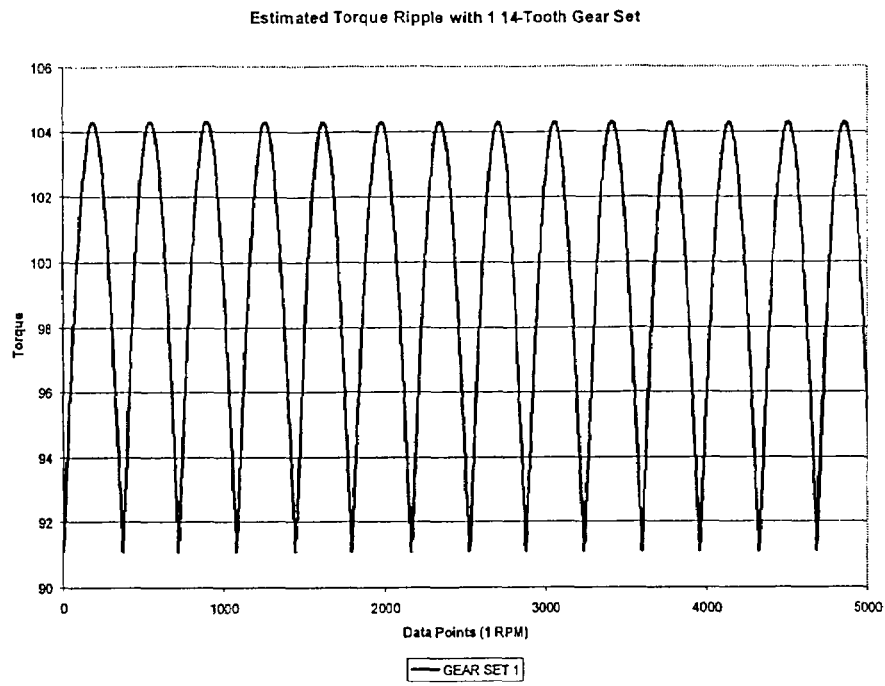
FIG. 4 is a graph illustrating torque ripple arising from each of the gear sets.
Figure 5:
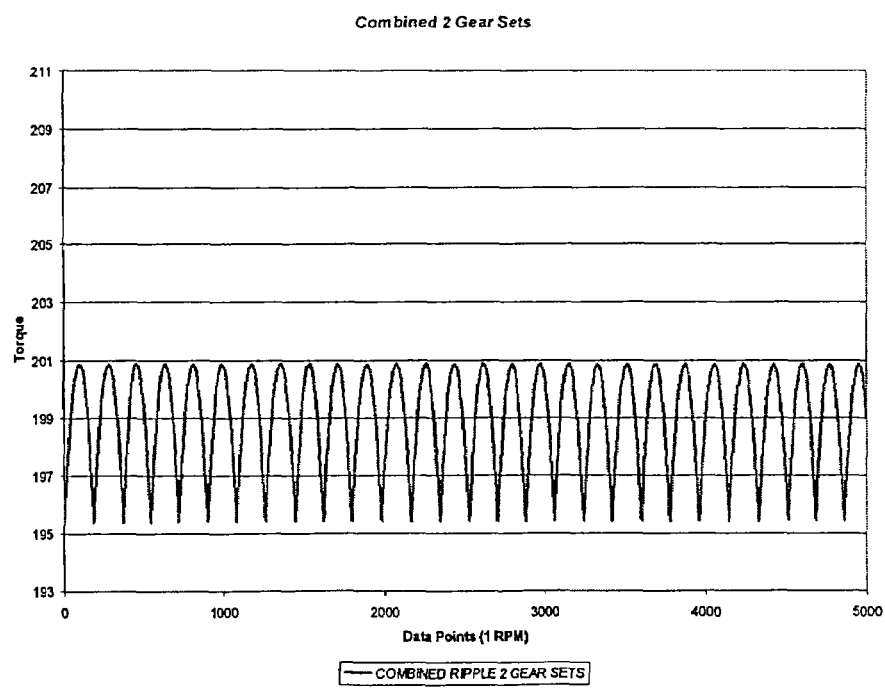
FIG. 5 is a graph illustrating torque ripple when two of the gear sets are used to power the hydraulic drive.
Figure 6:
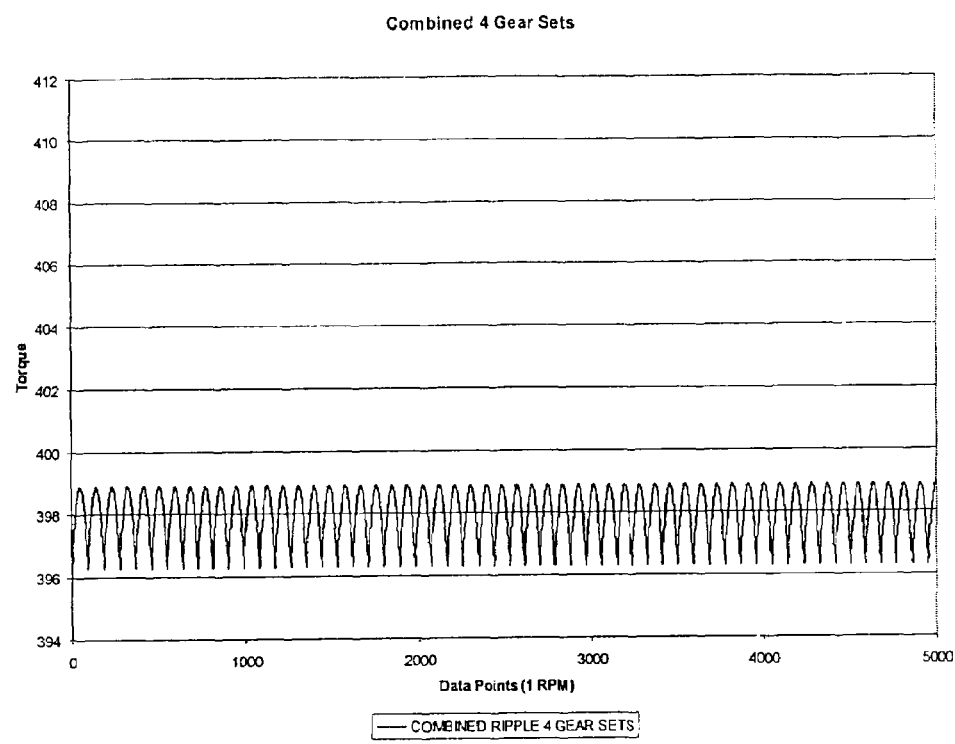
FIG. 6 is a graph illustrating torque ripple when all four gear sets are used to power the hydraulic drive.

By offsetting the gear teeth of the gear motor pinion 33 of opposing gear sets and/or all of the gear motors, torque ripple may be significantly decreased or even cancelled. FIG. 4 illustrates predicted torque ripple (estimated at about 12.5% with fourteen ripples) that may arise from one of the gear sets 25 where each gear has fourteen gear teeth. FIG. 5 illustrates predicted torque ripple (estimated at about 2.6% with 28 ripples) that may arise when two gear sets are used. Note the performance improvement from FIG. 4 to FIG. 5. Even greater improvement can be achieved when all four gear sets are used, the predicted reduced torque ripple (estimated at about 0.7% with 56 ripples) being illustrated in FIG. 6. As illustrated, substantial torque ripple cancellation can be obtained.

The hydraulic drive 15 provides multiple speed capabilities. For high speed operation, one, two or more gear motors 26, but usually less than all gear motors, can be operated to drive the ring gear 35 (or other common output device). When more torque is needed at medium and/or low speeds, more gear motors can be operated. That is, low speed high torque output is provided by engaging all gear motors (four gear motors in the illustrated embodiment). As speed of the output shaft increases, the number of motors driving the ring gear can be decreased to allow for increased speed with decreased torque requirements.

Preferably, opposing sets of gear motors are operated at any given time, and preferably the gear motors of the opposed sets are out of phase as above discussed so as to eliminate or cancel torque ripple. A controller 40 including automatic pressure compensation control may be provided to allow for automatic upshifting and downshifting of the gear motors. The hydraulic drive may include valving between motors or a clutching mechanism, as depicted at 42 in FIG. 1, particularly valving and electronic controls to provide automatic speed/torque control. The valving and/or clutching typically will be provided internal to the housing. The valving and/or clutching can be of conventional design, as may other aspects of the controller 40. That is, given the herein description of the hydraulic drive, those skilled in the art can devise appropriate control circuitry and components for selectively engaging one or more of the hydraulic motors as herein described.

The torque ripple cancelling feature may be applied to other types of hydraulic motors, such as radial piston motors that exhibit a characteristic periodic torque ripple. The output efficiency of a hydraulic drive using gear motors, however, will be higher at the low end of the speed range and higher efficiency is gained at the low and high speed ranges, and thus gear motors are preferred.

While a ring gear is shown in the illustrated embodiment, other arrangements may also be utilized. For instance, the ring gear may be replaced by an internal gear or a planetary drive configuration may be used in which the gear motors interact with the output shaft 22 via a sun gear.

If desired, each gear set may additionally include an idler gear to prevent the deflection or bending moment of the gear motor drive shafts.

As can now be appreciated by those skilled in the art, the hydraulic drive can use conventional and proven gear design technology in a unique manner that affords additional functionality. The hydraulic drive can be configured, such as shown, to allow for stacking of multiple hydraulic drives to increase torque loads and increase volumetric output.

Provision also may be made, via suitable porting in the housing, for lubricating the gear motors even when not engaged to maintain lubrication of the "off" gear motors and further to prevent overheating, particularly during high speed operation when less than all of the gear motors are "on".

The multi-gear motor drive may be arranged in a compact package to reduce radial dimensions.

Figure 7:
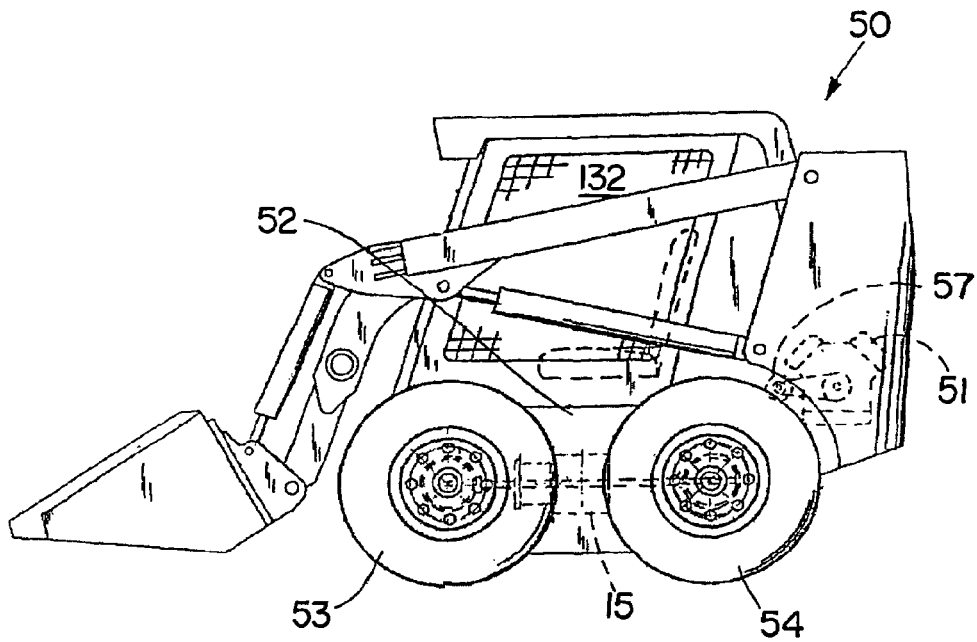
FIG. 7 shows an exemplary skid-steer vehicle in which the hydraulic drive of FIG. 1 can be employed.

Referring now to FIG. 7, an exemplary use of the hydraulic drive 15 is shown in relation to a vehicle, particularly a skid-steer utility vehicle 50. The vehicle 50 may be of a conventional design including an engine 51 that is mounted on a chassis 52. The chassis 52 is supported on wheels, there being one front wheel 53 and one rear wheel 54 on each side of the chassis. A hydraulic drive 15 is provided on each side of the vehicle to drive the wheels on the same side of the vehicle. Hydraulic fluid for each hydraulic drive is provided by one or more hydraulic pumps 57. The pumps are coupled to and driven by the engine 51, which may be an internal combustion engine. Each hydraulic drive may have associated therewith a conventional drive arrangement including a gearbox, driveshaft, front and rear axle housings, and the drive wheels, as desired.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hydraulic drive comprising multiple gear motors each having a gear motor output shaft, and a common gear engaged by the output shafts of the multiple gear motors, wherein the multiple gear motors include respective meshed pairs of gears disposed in a common housing, one of the gears of each pair has an output shaft provided with a pinion gear for engaging the common gear, and the phase relationship between the pinion gear and corresponding gear of each gear set varies from gear set to gear set.

2. A hydraulic drive as set forth in claim 1, wherein the common gear is a ring gear.

3. A hydraulic drive as set forth in claim 1, wherein the common gear drives an output shaft of the hydraulic drive.

4. A hydraulic drive as set forth in claim 3, wherein the multiple gear motors are housed within a housing, and the output shaft of the hydraulic drive extends from at least one end of the housing.

5. A hydraulic drive as set forth in claim 1, wherein the gear motors are circumferentially equally spaced apart.

6. A hydraulic drive as set forth in claim 1, comprising a controller for controlling operation of the gear motors to control output speed and torque of the hydraulic drive.

7. A vehicle comprising at least one drive wheel, and the hydraulic drive of claim 1 drivingly coupled to the drive wheel.

8. A hydraulic drive comprising multiple hydraulic motors each having an output shaft, and a common gear engaged by the output shafts of the multiple hydraulic motors, and wherein each hydraulic motor has a characteristic periodic torque ripple out of phase with the characteristic periodic torque ripple of at least one other hydraulic motor for cancelling torque ripple and thereby reducing the torque ripple at the common gear, wherein the hydraulic motors are gear motors.

9. A hydraulic drive as set forth in claim 8, wherein the common gear drives an output shaft of the hydraulic drive.

10. A hydraulic drive as set forth in claim 9, wherein the multiple hydraulic motors are housed within a housing, and the output shaft of the hydraulic drive extends from at least one end of the housing.

11. A hydraulic drive comprising multiple hydraulic motors each having an output shaft, and a common gear engaged by the output shafts of the multiple hydraulic motors, and wherein each hydraulic motor has a characteristic periodic torque ripple out of phase with the characteristic periodic torque ripple of at least one other hydraulic motor for cancelling torque ripple and thereby reducing the torque ripple at the common gear, wherein the multiple hydraulic motors are gear motors respectively including meshed pairs of gears disposed in a common housing.

12. A hydraulic drive as set forth in claim 11, wherein one of the gears of each pair has an output shaft provided with a pinion gear for engaging the common gear.

13. A hydraulic drive comprising multiple hydraulic motors each having an output shaft, and a common gear engaged by the output shafts of the multiple hydraulic motors, and wherein each hydraulic motor has a characteristic periodic torque ripple out of phase with the characteristic periodic torque ripple of at least one other hydraulic motor for cancelling torque ripple and thereby reducing the torque le at the common gear, wherein each hydraulic motor has an output shaft provided with a pinion gear for engaging the common gear, and the phase relationship between the pinion gear and corresponding gear of each gear set varies from gear set to gear set.

14. A hydraulic drive as set forth in claim 13, wherein the hydraulic motors are circumferentially equally spaced apart.

15. A hydraulic drive as set forth in claim 13, comprising a controller for controlling operation of the hydraulic motors to control output speed and torque of the hydraulic drive.

16. A vehicle comprising at least one drive wheel, and the hydraulic drive of claim 13 drivingly coupled to the drive wheel.

\* \* \* \* \*